United States Patent Office 3,290,325
Patented Dec. 6, 1966

3,290,325
SOLUBLE ALKANOL AMMONIUM THIAZOLIDINE CARBOXYLATES
Francois Bertrand, Geneva, Switzerland, assignor to Sogespar, S.A., Fribourg, Switzerland
No Drawing. Filed Apr. 7, 1965, Ser. No. 446,399
Claims priority, application Switzerland, Apr. 7, 1964, 4,372/64
6 Claims. (Cl. 260—306.7)

This invention is concerned with novel soluble salts of thiazolidine carboxylic acid and the preparation thereof.

Thiazolidine carboxylic acid has the formula:

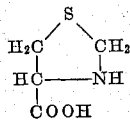

and has been described in J. Biol. Chem. 227, 393–406 (1957) and J. Amer. Chem. Soc. 59, 200–206 (1937). As is known, thiazolidine carboxylic acid is practically insoluble in alcohols, only slightly soluble in cold water, and more readily soluble in hot water. As its formula indicates, thiazolidine carboxylic acid is an amphoteric compound and therefore difficult to salify. The pH of 0.1 M solution of thiazolidine carboxylic acid is 3.6.

It has been discovered that certain salt derivatives of thiazolidine carboxylic acid are very soluble both in water and in the lower alcohols. These salts are highly crystalline and have well defined characteristics, so that they can be administered by mouth or by injection for the treatment of certain ailments, in particular of the liver.

The thiazolidine carboxylates of the invention are salts of amino alcohols of the formula:

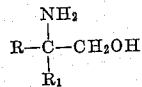

where R may be a $CH_3$ or $CH_2OH$ group, and $R_1$ is lower alkyl, preferably a $CH_3$ or $C_2H_5$ group.

In preparing the above-described amino alcohol salts, thiazolidine carboxylic acid is treated with about 1 to 2 moles of said amino alcohol, preferably 1.1 to 1.2 moles of said amino alcohol per mole of thiazolidine carboxylic acid. The amino alcohol may be dissolved in a solvent such as an alcohol or water and the salification carried out in an alcoholic or aqueous medium. Thiazolidine carboxylic acid and the amino alcohol go into solution easily when heated on a waterbath.

If water is used as a solvent, it is necessary to concentrate the solution before isolating the crystalline product; the product crystallizes from alcoholic solutions simply by cooling. The salts thus obtained are insoluble in sulfuric ether.

The invention will be further understood from the following specific examples. However, it will be understood that these examples are not to be construed as limiting the scope of the present invention in any manner.

Example 1

100 g. of 2-amino-2-methyl-1-propanol are dissolved in 500 ml. of isopropyl alcohol. The solution is heated on the waterbath and 133 g. of thiazolidine carboxylic acid are added thereto. A solution forms, which is allowed to cool. On the average, 200 g. of product in beautiful crystals are obtained. The melting point of the product is 110–112° C. The pH of a 0.1 M aqueous solution (2.22 g. in 100 ml. of water) is 7.8.

Example 2

Proceeding in the same manner as in Example 1 with 2-amino-2-methyl-1.3-propanediol, 120 g. of aminomethyl-propanediol are dissolved in the hot in 1000 ml. of isopropyl alcohol. 133 g. of thiazolidine carboxylic acid is added, the solution is allowed to cool, filtered and washed with isopropyl alcohol and sulfuric ether. 210–220 g. of product having a melting point of 110° C. are obtained.

Example 3

120 g. of 2-amino-2-ethyl-1.3-propanediol are dissolved in the hot in 500 ml. of isopropyl alcohol. 133 g. of thiazolidine carboxylic acid is added thereto and then the solution is allowed to cool. The crystals obtained are washed as indicated in Example 2. 200–220 g. of crystals having a melting point of 105° C. are obtained.

What I claim and desire to secure by Letters Patent is:
1. A 2-amino-2-loweralkyl-1-propanol salt of thiazolidine carboxy acid.
2. A 2-amino-2-loweralkyl-1, 3-propanediol salt of thiazolidine carboxylic acid.
3. The 2-amino-2-methyl-1-propanol salt of thiazolidine carboxylic acid.
4. The 2-amino-2-ethyl-1-propanol salt of thiazolidine carboxylic acid.
5. The 2-amino-2-methyl-1,3-propanediol salt of thiazolidine carboxylic acid.
6. The 2-amino-2-ethyl-1, 3-propanediol salt of thiazolidine carboxylic acid.

References Cited by the Examiner
UNITED STATES PATENTS 2,404,319  7/1946  Shelton _____ 260—253
2,802,864  8/1957  Vassel _____ 260—501

OTHER REFERENCES

Greenstein et al.: Chemistry of the Amino Acids, volume 1 (New York, 1961), page 648.

ALEX MAZEL, *Primary Examiner.*

H. R. JILES, A. D. ROLLINS, *Assistant Examiners.*